US008103399B2

(12) United States Patent   (10) Patent No.: US 8,103,399 B2
Davis et al.                (45) Date of Patent:     Jan. 24, 2012

(54) SYSTEM AND METHOD FOR TRANSFERRING VEHICLE SERVICE DATA

(75) Inventors: Neil A. Davis, Stockton, CA (US); John H. Dwulet, Lakeside, CA (US)

(73) Assignee: Snap-on Incorporated, Kenosha, WI (US)

( * ) Notice: Subject to any disclaimer, the term of this patent is extended or adjusted under 35 U.S.C. 154(b) by 1167 days.

(21) Appl. No.: 11/758,574

(22) Filed: Jun. 5, 2007

(65) Prior Publication Data

US 2008/0306651 A1    Dec. 11, 2008

(51) Int. Cl.
G06F 7/00    (2006.01)
(52) U.S. Cl. .......................................... 701/29.1; 700/26
(58) Field of Classification Search .................. 701/33, 701/29, 36, 29.1; 700/26; 707/6; 600/300; 705/1.1, 7, 8
See application file for complete search history.

(56) References Cited

U.S. PATENT DOCUMENTS

| | | | |
|---|---|---|---|
| 6,314,422 B1 | 11/2001 | Barket et al. | |
| 7,209,817 B2 * | 4/2007 | Abdel-Malek et al. | 701/33 |
| 7,783,507 B2 * | 8/2010 | Schick et al. | 705/7.11 |
| 2002/0007237 A1 | 1/2002 | Phung et al. | |
| 2005/0038580 A1 | 2/2005 | Seim et al. | |
| 2005/0090940 A1 | 4/2005 | Pajakowski et al. | |
| 2005/0231388 A1 | 10/2005 | Suggs, Sr. | |

FOREIGN PATENT DOCUMENTS

WO    WO 02/17118 A2    2/2002

OTHER PUBLICATIONS

European Patent Office, International Search Report for International Patent Application No. PCT/US2008/062498.
European Patent Office, Written Opinion of the International Searching Authority for International Patent Application No. PCT/US2008/062498.
Chief Automotive Systems, Velocity Measuring System, Users Manual, Apr. 3, 2007.
Chief Automotive Systems, Velocity Measuring System, Parts Manual, Apr. 11, 2005.
Chief Automotive Systems, Vector Measuring System, Users Manual, Apr. 3, 2007.
Chief Automotive Systems, Vector Measuring System, Parts Manual, Apr. 3, 2007.
The International Bureau of WIPO, International Preliminary Report on Patentability for International Application No. PCT/US2008/062498, Dec. 7, 2009.
Australian Government—IP Australia, Examiner's report on Australian patent application No. 2008262165, Oct. 26, 2010.

* cited by examiner

*Primary Examiner* — Dalena Tran
(74) *Attorney, Agent, or Firm* — McDonnell Boehnen Hulbert & Berghoff LLP

(57) ABSTRACT

A system and method directed to generating a transfer file of categorized vehicle service data, wherein the vehicle service data was captured by a vehicle service tool, and transmitting the transfer file to a remote device. The remote device may store the categorized vehicle service data and thereafter send the categorized vehicle service data back to the vehicle service tool that captured the vehicle service data or to another vehicle service tool for use in comparing current vehicle service conditions to previous service conditions represented by the categorized vehicle service data. The transfer file may include a variety of categories such as diagnostic trouble codes, screen shots, calibration data, and parameter identifiers.

21 Claims, 4 Drawing Sheets

SYSTEM AND METHOD FOR TRANSFERRING VEHICLE SERVICE DATA

FIELD OF DISCLOSURE

This disclosure relates to vehicle service tools, and more particularly to vehicle service data provided from a vehicle under service to a vehicle service tool.

BACKGROUND

Many vehicle service facilities have service writers that greet customers that bring their vehicle to the service facilities, and service technicians that perform service procedures to the customer vehicles. The service writers may talk to each customer to determine why the customer brought their vehicle in for service. At some vehicle service facilities, service writers prepare hand-written repair orders that indicate the reason why each vehicle has been brought in for service. While the vehicles are being serviced at these service facilities, service technicians or service writers may record hand-written notes on each repair order, such as notes to indicate the type of service performed to each vehicle. At other vehicle service facilities, service writers prepare machine-written repair orders that indicate why each has been brought in for service. While the vehicles are being serviced at these service facilities, service technicians or service writers may record hand-written notes on repair orders so as to indicate the type of service performed to each vehicle.

At many vehicle service facilities, service writers typically talk to the service technician that performed service procedures to a given vehicle and/or to a person that works in a service parts department to determine the type of service performed to the given vehicle. Based on the information provided to the service writer, the service writer may record hand-written notes on the repair order for the given vehicle. Additionally, the service writer or technician may record on the repair order hand-written notes regarding diagnostic information gathered from the given vehicle. For example, the service writer may record on the repair order hand-written notes indicating one or more diagnostic trouble codes that were set in an electronic control unit (ECU) of the given vehicle.

Subsequently, when the given vehicle is brought in for additional service at the service facility, in order to determine the type of service previously performed to the given vehicle, the service writer or service technician may need to read the hand-written notes recorded on previous repairs orders used for the given vehicle. In some instances, the previous repair orders may have been damaged or lost, the hand-written notes may be illegible, and/or the hand-written notes may be inaccurate and/or incorrect. In these instances, service technicians may be unable to refer to the service history of the given vehicle.

SUMMARY

Vehicles, such as an automobile, generate vehicle service data that may be retrieved by a vehicle service tool. A device remote from a vehicle service tool may be programmed to use vehicle service data, received from the vehicle service tool, for various purposes. Described herein is a method and system for transferring vehicle service data from a vehicle service tool to a remote device. The vehicle service data may be categorized into pre-selected categories and the categorized vehicle service data may be placed into a transfer file that may be transmitted from the vehicle service tool to the remote device.

In one respect, an exemplary embodiment is arranged as a method comprising: (i) at a vehicle service tool, receiving a vehicle identifier associated with a vehicle, and vehicle service data from the vehicle, (ii) categorizing the vehicle service data received from the vehicle, (iii) generating a transfer file including the vehicle identifier and one or more categories of vehicle service data, and (iv) transmitting the transfer file to a network for transmission, in turn, to a remote device. Generating the transfer file comprises populating the one or more categories of vehicle service data with the categorized vehicle service data.

In another respect, an exemplary embodiment is arranged as a method comprising: (i) connecting a vehicle service tool to a given vehicle having a service condition, (ii) at the vehicle service tool, receiving vehicle service data associated with the given vehicle's service condition; wherein the vehicle service tool receives the vehicle service data from the given vehicle, (iii) interpreting the vehicle service data received from the given vehicle and responsively categorizing at least a portion of the interpreted vehicle service data, (iv) generating a transfer file including a vehicle identifier and one or more categories of vehicle service data related to the detected service condition, and (v) transmitting the transfer file to a network for transmission, in turn, to a remote device. Generating the transfer file comprises populating the one or more categories of vehicle service data with the categorized vehicle service data.

In yet another respect, an exemplary embodiment is arranged as a system comprising: (i) a processor, (ii) a vehicle interface that receives vehicle service data from a vehicle and provides the vehicle service data to the processor, (iii) a network interface that interfaces to a network so as to allow the vehicle service tool to communicate with a remote device via the network, and (iv) data storage containing computer-readable program instructions executable by the processor. In accordance with this exemplary embodiment, the computer-readable program instructions include instructions that (i) cause the processor to categorize the vehicle data received from the vehicle, (ii) generate a transfer file including one or more categories of vehicle service data and including a vehicle identifier associated with the vehicle, and (iii) cause the network interface to transmit the transfer file to the network for transmission, in turn, to a remote device.

These as well as other aspects and advantages will become apparent to those of ordinary skill in the art by reading the following detailed description, with reference where appropriate to the accompanying drawings.

BRIEF DESCRIPTION OF DRAWINGS

Various examples of embodiments arranged as a method or a system are described herein with reference to the following drawings, in which.

DETAILED DESCRIPTION

Figure 1:
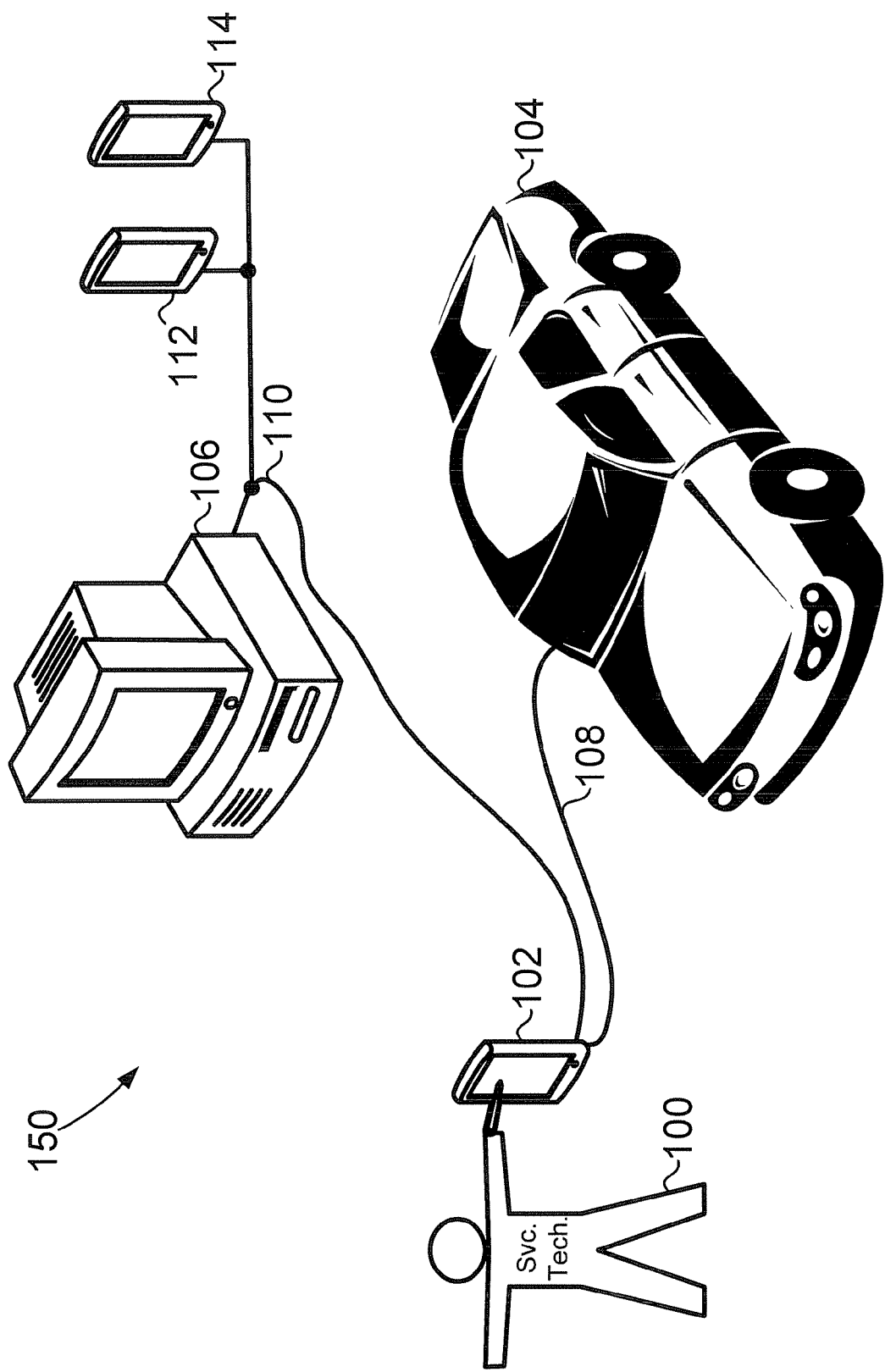
FIG. 1 depicts an arrangement in which an exemplary method and system may be carried out.

Reference numerals are shown in the drawings to identify various elements of the drawings. Drawing elements having identical reference numerals are substantially identical or identical elements.

1. Overview

This description describes a method and system for transferring vehicle service data captured by a vehicle service tool to a remote device. The vehicle service tool may capture vehicle service data from a given vehicle, such as data associated with a particular service condition of the given vehicle, interpret the data so as to determine which categories of a transfer file the vehicle service data should be populated, and then generate the transfer file. The transfer file may include a vehicle identifier associated with the given vehicle and categories to be populated with the vehicle service data received from the given vehicle. The transfer file may be transmitted from the vehicle service tool to a remote device. The remote device may store the transfer file and/or the categorized vehicle service data contained within the transfer file in a data record for the given vehicle. Thereafter, the remote device may provide the vehicle service data within the transfer file to another device, such as the vehicle service tool that captured the vehicle service data or another vehicle service tool. In this way, the vehicle service tool that receives the vehicle service data from the remote device may compare this data to vehicle service data currently being received at the vehicle service tool from the given vehicle.

2. Exemplary Architecture

FIG. 1 depicts an arrangement 150 in which an exemplary method and system may be carried out. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

As shown in FIG. 1, a service technician 100 has a vehicle service tool 102 that interfaces to a vehicle 104 (e.g., the vehicle under service) and to a remote vehicle service tool interface device 106. Vehicle service tool 102 may interface to vehicle 104 via a vehicle interface cable 108. Alternatively or additionally, vehicle service tool 102 may interface to vehicle 104 via an air interface (i.e., wirelessly). Vehicle service tool 102 may interface to the remote device 106 via a network cable 110, such as an Ethernet network cable, a private network, such as local area network within a service facility, and/or a public network, such as the Internet. Alternatively or additionally, vehicle service tool 102 may interface to remote device 106 via an air interface.

Vehicle service tool 102 may be arranged in any of a variety of configurations. For example, vehicle service tool 102 may be arranged as a portable handheld service tool that can be carried by service technician 100 to a location desired by the service technician 100, such as the front seat of vehicle 104 or an engine compartment under a hood of vehicle 104. As another example, vehicle service tool 102 may be arranged as a desktop personal computer placed on a roll-around cart that may be rolled in proximity to vehicle 104. Other exemplary arrangements of vehicle service tool 102 are also possible.

As shown in FIG. 1, exemplary arrangement 150 also includes vehicle service tools 112, 114. Vehicle service tool 102 may have a manufacturer-assigned model number and a software version indicating a particular revision level of program instructions contained in vehicle service tool 102. Vehicle service tools 112, 114 may be substantially similar to vehicle service tool, such as vehicle service tools that have the same model number and the same software version as vehicle service tool 102. Alternatively, one or more of vehicle service tools 112, 114 may be a different vehicle service tool, such as a vehicle service tool having a different model number and/or a different software version. Arrangement 150 may function without vehicle service tools 112, 114. Alternatively, arrangement 150 may function with one or more additional vehicle service tools (not shown) and/or one or more additional remote devices (not shown).

Vehicle 104 is an automobile. Alternatively, and by way of example, a vehicle of the exemplary embodiment may comprise a truck, a boat or ship, a motorcycle, a generator, or an airplane. Any of these vehicles may be a vehicle under service. Other examples of a vehicle are also possible.

Vehicle 104 may include a data link connector (DLC). Vehicle interface cable 108 may include a first connector that connects to a vehicle interface of vehicle service tool 102 and a second connector that connects to the DLC of vehicle 104.

Remote vehicle service tool interface device 106 may comprise any of a variety of devices. For example, remote device 106 may comprise a network server and/or a desktop computer executing computer-readable program instructions to carry out service shop management functions and/or program instructions to provide vehicle reference data to vehicle service tools 102, 112, 114.

Remote device 106 may be located in the same service facility as vehicle service tool 102 or may be located at a premises remote from the location of vehicle service tool 102. Other examples of remote device 106 are also possible.

The embodiments described herein may include or be utilized with any appropriate voltage or current source, such as a battery, an alternator, a fuel cell, and the like, providing any appropriate current and/or voltage, such as about 12 Volts, about 42 Volts and the like.

Additionally, the embodiments described herein may be used with any desired system or engine. Those systems or engines may comprises items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

Figure 2:
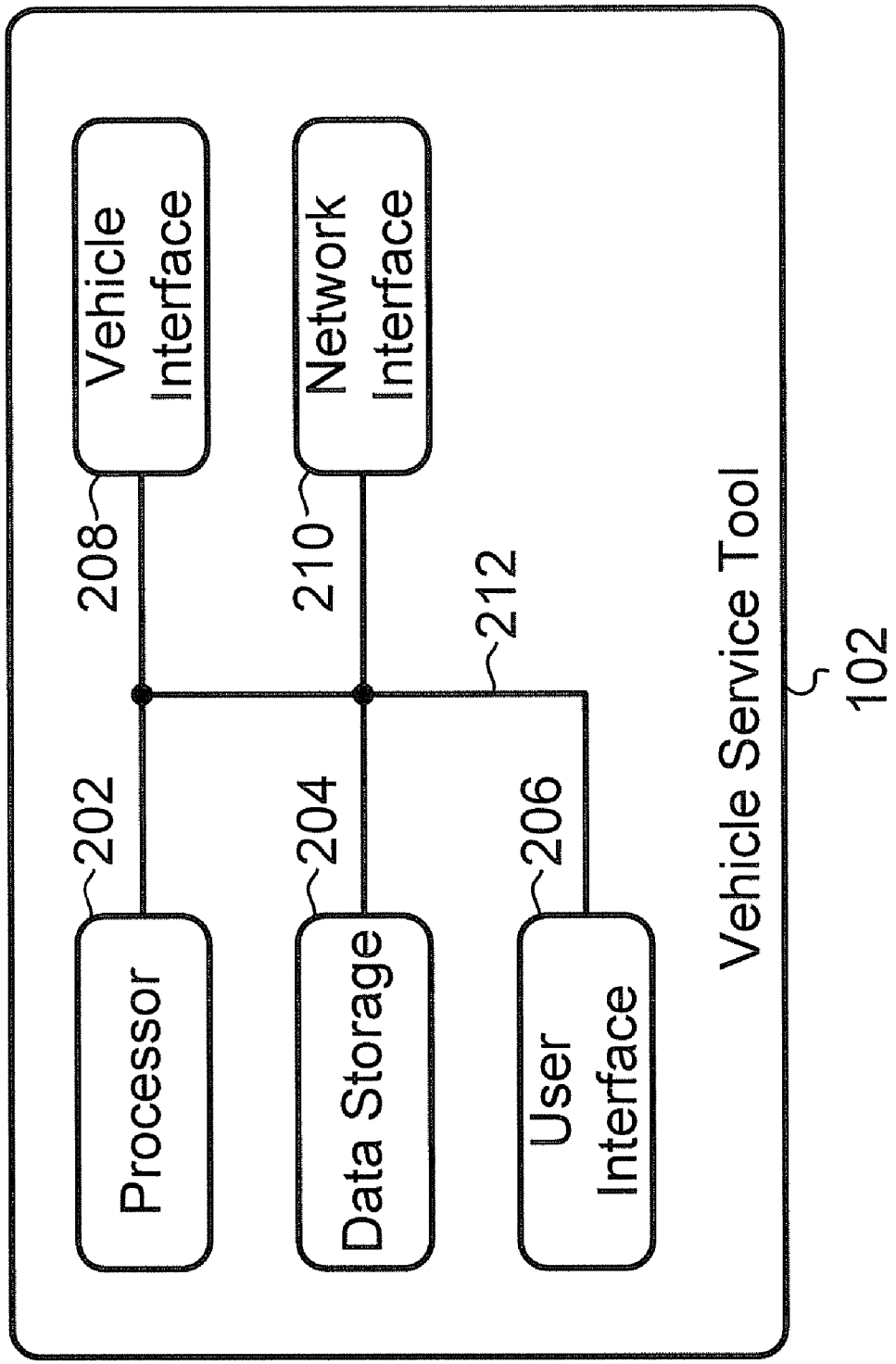
FIG. 2 depicts a simplified block diagram of an exemplary vehicle service tool.

FIG. 2 is a block diagram showing details of vehicle service tool 102. As shown in FIG. 2, vehicle service tool 102 comprises a processor 202, data storage 204, a user interface 206, a vehicle interface 208, and a network interface 210, all linked together via a system bus, network, or other connection mechanism 212.

Processor 202 may comprise one or more general purpose processors (e.g., INTEL microprocessors) and/or one or more special purpose processors (e.g., digital signal processors). Processor 202 may execute computer-readable program instructions, such as program instructions to carry out any of the functions described in this description.

Data storage 204 comprises a computer readable medium. A computer readable medium may comprise volatile and/or non-volatile storage components, such as optical, magnetic, organic or other memory or disc storage, which can be integrated in whole or in part with a processor, such as processor 202. Alternatively, the entire computer readable medium may be remote from processor 202 and coupled to processor 202 by connection mechanism 212 and/or network cable 110.

Data storage 204 may store various types of data. For instance, data storage 204 may store vehicle identifiers and vehicle service data received from vehicle 104 and computer-readable program instructions executable by processor 202.

The computer-readable program instructions may comprise a variety of instructions. For example, the computer-readable program instructions may comprise instructions that cause processor 202 to categorize vehicle data received via vehicle interface 208 from vehicle 104. As another example, the computer-readable program instructions may comprise instructions that cause processor 202 to generate a transfer file including one or more categories of vehicle service data and including a vehicle identifier associated with vehicle 104. As yet another example, the computer-readable program instructions may comprise instructions that cause network interface 210 to transmit the transfer file to a network (e.g., a communication link) for transmission, in turn, to remote device 106.

User interface 206 may comprise any of a variety of user interface components. For example, user interface 206 may comprise a display for displaying data to a user, such as vehicle reference data and/or a message for prompting a user to enter data via the user interface 206. The display may comprise a liquid crystal display (LCD) display, a cathode ray tube (CRT) display, a plasma display, or another type of display. As another example, user interface 206 may comprise a data entry component, such as a keyboard in a QWERTY keyboard arrangement, a touch screen such as a resistive or capacitive touch screen, or another type of data entry component.

Vehicle interface 208 provides means for vehicle service tool 102 to connect to vehicle 104 via vehicle interface cable 108. Alternatively, vehicle interface 208 may provide means for vehicle service tool 102 to interface with vehicle 104 via an air interface. Vehicle interface 208 may transmit to vehicle 104 messages for requesting vehicle service data. For example, vehicle interface 208 may transmit to vehicle 104 a request for a vehicle identifier and/or a request for vehicle service data. Vehicle interface 208 may receive a vehicle identifier or vehicle service data from vehicle 104. After receiving a vehicle identifier, vehicle service data, or some other data from vehicle 104, vehicle interface 208 may provide the received data to processor 202.

Network interface 210 may comprise any of a variety of devices that function to provide vehicle service tool 102 with an interface to a wired network, such as a network including network cable 110, or to a wireless network, such as a wireless network functioning according to an IEEE 802.11 standard, a cellular telephone standard such as a code division multiple access standard, or another standard. Network interface 210 may comprise a network interface card including a transceiver for transmitting data to remote device 106 and for receiving data from remote device 106.

3. Exemplary Operation

Figure 3:
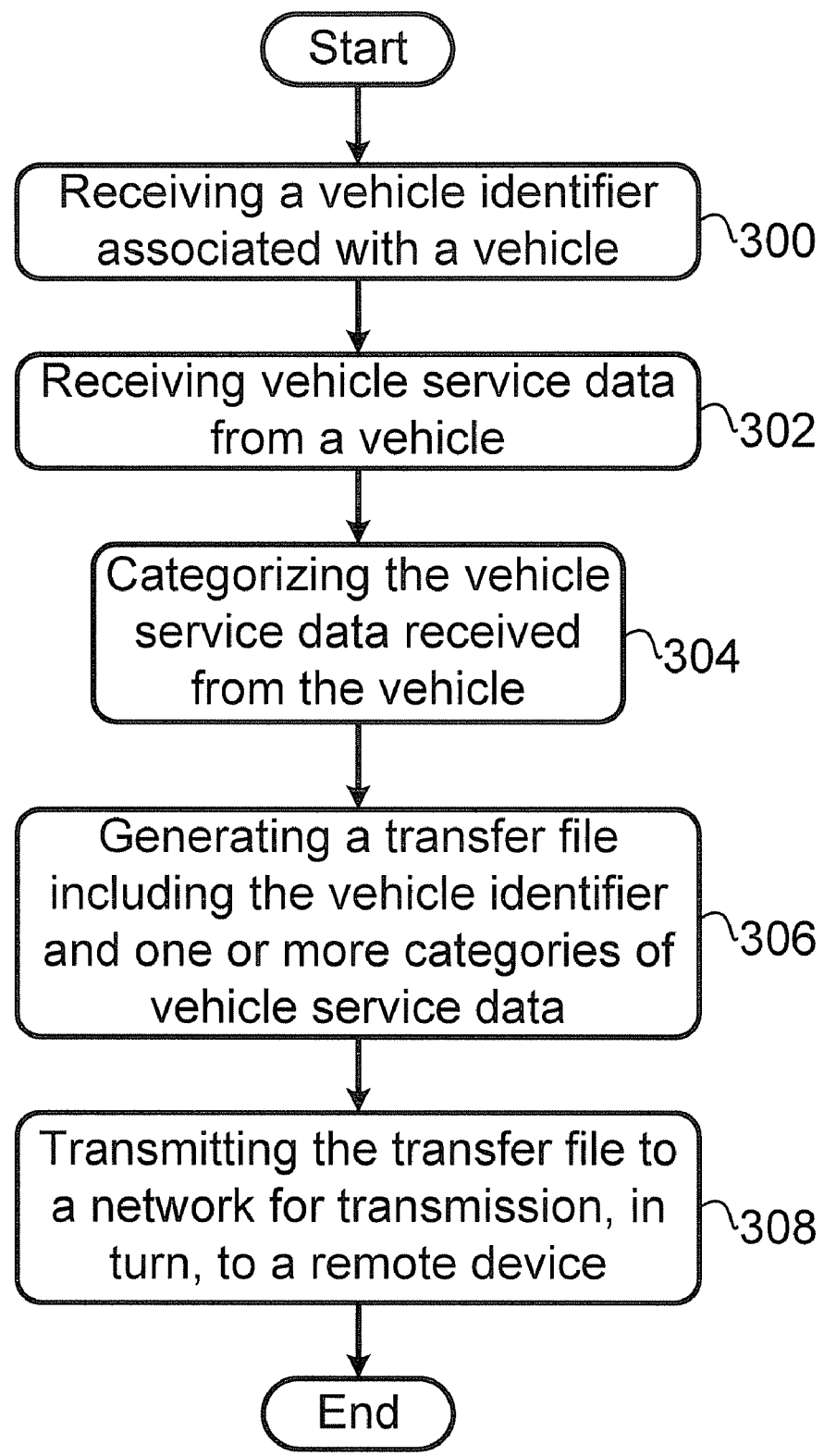
FIG. 3 depicts a flow chart showing a set of functions that may be carried out in accordance with an exemplary embodiment.

FIG. 3 depicts a flow chart provided to illustrate a set of the functions that may be carried out in accordance with an exemplary embodiment. Processor 202 may execute computer-readable program instructions, stored in data storage 204, so as to carry out the functions shown in FIG. 3.

The functions shown in FIG. 3 may be carried out in a sequence as shown in FIG. 3. Alternatively, the functions shown in FIG. 3 may be carried out according to another sequence (not shown). Additionally, two or more of the functions shown in FIG. 3 may be carried out at substantially the same time. For example, the functions shown in blocks 300 and 302 may be carried out at substantially the same time.

As shown in FIG. 3, block 300 includes receiving a vehicle identifier associated with a vehicle, such as vehicle 104. The vehicle identifier is received at a vehicle service tool, such as vehicle service tool 102. The vehicle identifier may be any of a variety of identifiers useable to identify vehicle 104. Alternatively, the vehicle identifier may be a combination of two or more identifiers that in combination, or separately, may be used to identify vehicle 104.

As an example, the vehicle identifier may comprise a vehicle identification number (VIN) associated with vehicle 104. For some motor vehicles, such as automobiles, the VIN comprises 17 alpha-numeric characters. As an example, a VIN may be a 17 character identifier that is arranged according to ISO standard 3770 or ISO standard 3880. Other examples of a VIN are also possible.

As another example, the vehicle identifier may comprise a customer name associated with vehicle 104. For instance, the customer name may be a name of a rental company that owns a fleet of vehicles including vehicle 104 or the name of a man or woman that owns vehicle 104.

As yet another example, the vehicle identifier may comprise a customer number associated with vehicle 104. As an example, a service writer of a service facility may assign a unique customer number for each vehicle that is brought to the service facility for service. Customer numbers may be used by the service facility, for example, as a way to maintain customer privacy.

As still yet another example, the vehicle identifier may comprise a repair order number associated with vehicle 104. The repair order number may be a number that is pre-printed on a repair order used by a service facility to record information pertaining to the servicing of vehicle 104.

In one respect, the vehicle identifier may be received via user interface 206. In this regard, for example, after connecting vehicle service tool 102 to vehicle 104, user interface 206 may display a prompt requesting a user of vehicle service tool 102 to enter the vehicle identifier. The user may enter the vehicle identifier via a data entry device of user interface 206. User interface 206 may provide the received vehicle identifier to processor 202.

In another respect, the vehicle identifier may be received from remote device 106. In this regard, for example, remote device 106 may transmit the vehicle identifier to network cable 110 for transmission, in turn, to vehicle service tool 102. Remote device may transmit the vehicle identifier in response to receiving from vehicle service tool 102 a request for the vehicle identifier and/or a request for a repair order for vehicle 104. Alternatively, remote device 106 may comprise program logic executable to "push" the vehicle identifier to vehicle service tool 102 (i.e., without the vehicle service tool 102 requesting the vehicle identifier).

Next, block 302 includes receiving vehicle service data from a vehicle. The vehicle service data is received at vehicle service tool 102. In order to receive the vehicle service data, vehicle service tool 102 may be connected to vehicle 104, and then operated to cause vehicle service tool 102 to send vehicle 104 a request for the vehicle service data. In response to this request, vehicle 104 may transmit the vehicle service data to vehicle service tool 102.

The vehicle service data may comprise data arranged in a vehicle manufacturer's format. For example, if vehicle 104 is a vehicle manufactured by General Motors (GM), Detroit, Mich., the vehicle service data may be arranged in a vehicle manufacturer's format such as Society of Automotive Engineers (SAE) Specification J-1850, a GMLAN protocol, or some other protocol used by GM. Other examples of a vehicle manufacturer's format for vehicle service data are also possible.

Next, block 304 includes categorizing the vehicle service data received from the vehicle. Categorizing the received vehicle service data may comprise interpreting the vehicle service data in the vehicle manufacturer's format and determining which of one or more categories of a transfer file the vehicle service data should be populated.

The transfer file may include any of a variety of categories, such as a diagnostic trouble code (DTC) category, a screen shot category, a calibration data category, a trouble shooting data category, a vehicle identification number category, and/or a parameter identification (PID) category. The screen shot category may be data that is captured while displayed on a display screen of vehicle service tool 102. Other examples of transfer file categories are also possible.

As an example, if the vehicle service data received from vehicle 104 comprises DTC data (e.g., a DTC indicating a fault with an engine oxygen sensor) for an engine controller electronic control unit (ECU) in vehicle 104, processor 202 may execute program instructions to interpret the vehicle service data as DTC data and determine that a DTC category of a transfer file should be populated with the DTC data. Other examples of categorizing the vehicle service data received from the vehicle are also possible.

The categories of the transfer file may be defined as standard categories. As an example, a defined standard category may be a category for air flow sensor data. In this way, any vehicle service data related to an air flow sensor may be populated in the air flow sensor data category, even though the manufacturer of the vehicle under service may refer to the data as mass air flow sensor data, air flow data, or by some other name or characteristic.

Next, block 306 includes generating a transfer file including the vehicle identifier and one or more categories of vehicle service data. Generation of the transfer file may comprise populating the one or more categories of vehicle service data with the categorized vehicle service data. The transfer file may be any of a variety of standard file formats, such as an extensible markup language (XML) file format or a hypertext markup language (HTML) format, or a format customized for vehicle service tools 102, 112, 114 and remote device 106. The transfer file is in a format readable by remote device 106.

The transfer file may be associated with an attachment file. The attachment file may comprise a graphical media file, such as a media file showing an oscilloscope pattern captured by vehicle service tool 102, or a video media file, such as an Motion Picture Experts Group (MPEG) file captured by vehicle service tool 102.

The transfer file may include data indicating a destination (e.g., the remote device 106) and data indicating the source that sent the transfer file (i.e., the vehicle service tool 102). Other examples of data that may be included in the transfer file are also possible.

Next, block 308 includes transmitting the transfer file to a network for transmission, in turn, to a remote device. Processor 202 may transmit the transfer file to network interface 210. Thereafter, network interface 210 transmits the transfer file to a wireless or wired network. In order to transmit the transfer file to the network, network interface 210 may establish a data session (e.g., a data session according to a point-to-point protocol, or a Session Initiation Protocol (SIP) data session). The network transports the transfer file to remote device 106.

Additionally, if an attachment file is associated with the transfer file, transmitting the transfer file may be carried out in combination with transmitting the attachment file to the remote device 106. For example, the attachment file and the transfer file may be transmitted to the network at substantially the same time and/or one of the files may be transmitted after the other file is transmitted.

Figure 4:
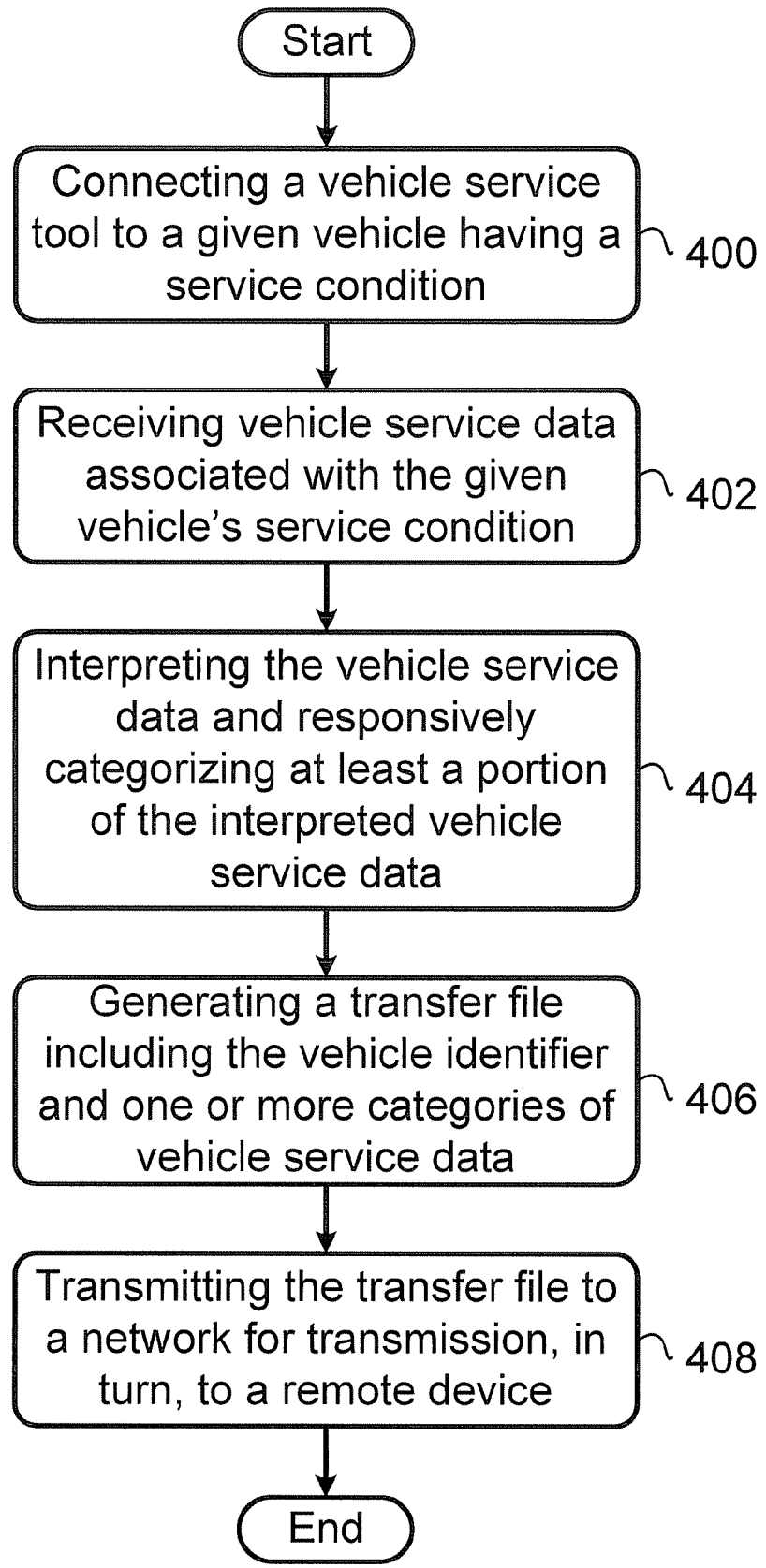
FIG. 4 depicts a flow chart showing another set of functions that may be carried out in accordance with an exemplary embodiment.

FIG. 4 depicts a flow chart provided to illustrate another set of functions that may be carried out in accordance with an exemplary embodiment. Processor 202 may execute computer-readable program instructions, stored in data storage 204, so as to carry out the functions shown in FIG. 4.

As shown in FIG. 4, block 400 includes connecting a vehicle service tool to a given vehicle having a service condition. Connecting the vehicle service tool 102 may include connecting the vehicle interface cable 108 to a DLC of vehicle 104 and to vehicle service tool 102. Vehicle interface cable 108 may be removably connected to vehicle service tool 102 such that connecting the vehicle service tool 102 merely requires connecting the vehicle interface cable 108 to vehicle 104. In another embodiment, connecting the vehicle service tool may include operating the vehicle service tool 102 so as to establish a wireless data session between the vehicle service tool 102 and vehicle 104.

The vehicle service condition may comprise any of a variety of service conditions, such as a DTC being set in an ECU of vehicle 104, or a programming mode to download software (e.g., calibration software) to an ECU of vehicle 104. Other examples of the vehicle service condition are also possible.

Next, block 402 includes receiving vehicle service data associated with the service condition of the given vehicle. As an example, vehicle service tool 102 may transmit to vehicle 104 a request for DTC data for the engine controller ECU, and vehicle 104 (i.e., the engine controller ECU) transmits the requested DTC data via the vehicle interface cable 108 for receipt by vehicle service tool 102.

Next, block 404 includes interpreting the vehicle service data and responsively categorizing at least a portion of the interpreted vehicle service data. Interpreting the vehicle service data may include determining that portions of the vehicle service data, such as DTCs, are associated with the vehicle service condition. The portions of the vehicle service data associated with the vehicle service condition may be identified as being data to be populated in specific categories (related to the vehicle service condition) of a transfer file. Processor 202 may execute program instructions to interpret the vehicle service data and to categorize the vehicle service data.

Next, block 406 includes generating a transfer file including the vehicle identifier and one or more categories of vehicle service data. Processor 202 may execute program instructions to populate the transfer file with the vehicle identifier associated with vehicle 104 and to populate one or more categories of the transfer file with the categorized vehicle service data associated with the vehicle service condition. The transfer file may be automatically generated based on vehicle service tool 102 detecting the vehicle service condition or in response to a user requesting generation of the transfer file upon the user determining that the vehicle service condition is occurring or has occurred. In the case in which a user requests generation of the transfer file, the user may select categories to be included in the transfer file. In the case in which the transfer file is automatically generated, the categories of the transfer file may be categories pre-selected by a manufacturer of vehicle service tool 102.

Next, block 408 includes transmitting the transfer file to a network for transmission, in turn, to a remote device. Transmitting the transfer file at block 408 may be carried out as described at block 308.

Additionally, the remote device 106 may carry out various functions after receiving a transfer file with or without an attachment file. For example, after receiving a transfer file and an attachment file, remote device 106 may cause the received files to be stored in data storage accessible to remote device 106. This data storage may be included at remote device 106 or remote from remote device 106. Additionally the data storage accessible to remote device 106 may contain a database including a data record associated with vehicle 104. The data record may comprise a plurality of fields including a field containing the vehicle identifier associated with vehicle 104 or an empty field for storing the vehicle identifier if the data record is a new data record being created for vehicle 104.

The remote device 106 may extract the vehicle identifier from the received transfer file so as to determine that the categorized vehicle service data contained within the transfer file is from vehicle 104. The remote device 106 may then extract the categorized vehicle service data or a portion of the categorized vehicle service data contained within the transfer file and then store the extracted vehicle service data into one or more fields of the data record associated with vehicle 104.

After storing the vehicle service data extracted from the transfer file, the remote device 106 may delete the transfer file from the data storage accessible to the remote device 106. In this way, the data storage accessible to the remote device 106 may continue to maintain the attachment file even though the transfer filed has been deleted.

After transmitting the transfer file, one of vehicle service tools 102, 112, 114 or some other remote device may transmit to remote device 106 a request for at least a portion of the data record associated with vehicle 104. The portion of the data record may comprise the data stored into the one or more fields of the data record (i.e., the data extracted from the transfer file). In response to receiving the request, remote device 106 may transmit to the requesting device (e.g., one of vehicle service tools 102, 112, 114) the requested portion of the data record. The requesting device may receive the data and display the portion of the data record. As an example, vehicle service tool 112 may display DTC data (e.g., a DTC) that was captured by vehicle service tool 102 while connected to vehicle 104.

The remote device 106 or the device requests the data extracted from the transfer file may analyze this data along with data extracted from a plurality of other transfer files for the same or other vehicles. The analysis may be carried out to detect trends such as a trend that cars of a certain make, model, and model year that set a given DTC require replacement of a certain part to fix the problem that causes the given DTC to be set. As another example, the remote device 106 or the device requests the data extracted from the transfer file may analyze the data extracted from the transfer file to determine which service technician at the service repair facility or which service repair stall at the service repair facility should be used for servicing the vehicle under service.

Additionally, after storing an attachment file at the data storage accessible to remote device 106, one of the vehicle service tools 102, 112, 114 or another remote device may transmit to remote device 106 a request for the attachment file. In response to receiving the request, remote device 106 may transmit the attachment file to the requesting device (e.g., one of vehicle service tools 102, 112, 114). The requesting device may receive the attachment file and thereafter display the attachment file received from the remote device 106. As an example, vehicle service tool 112 may display (e.g., play) the attachment file captured by vehicle service tool 102 while connected to vehicle 104. Other examples of functions remote device 106 can carry out after receiving the transfer file with or without an attachment file are also possible.

4. Conclusion

Example embodiments of a system and method have been described above. Those skilled in the art will understand, however, that changes and modifications may be made to these examples without departing from the true scope and spirit of the described systems and methods. The embodiments described in this description and the accompanying drawings are set forth for illustration and not as a limitation.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
    connecting a first vehicle service tool to a data link connector of a first vehicle, wherein the first vehicle generates vehicle service data;
    at the first vehicle service tool, receiving (i) a vehicle identifier associated with the first vehicle, and (ii) vehicle service data transmitted from the first vehicle via a vehicle interface cable that connects the first vehicle service tool to the data link connector of the first vehicle, wherein the received vehicle service data is arranged according to a vehicle manufacturer's format;
    categorizing, at the first vehicle service tool, the vehicle service data received from the first vehicle, wherein categorizing the received vehicle service data comprises a computer-readable processor at the first vehicle service tool interpreting the received vehicle service data to determine which data of the received vehicle service data, arranged according to the vehicle manufacturer's format, is to be populated into a category of a transfer file that is (i) to be generated via the first vehicle service tool and (ii) transmitted from the first vehicle service tool to a remote device;
    generating, via the first vehicle service tool, a transfer file including the vehicle identifier and one or more categories of vehicle service data, wherein generating the transfer file comprises populating the category of the transfer file with the categorized vehicle service data from the received vehicle data that is to be populated into the category of the transfer file, and wherein a format of the transfer file differs from the vehicle manufacturer's format; and
    the first vehicle service tool transmitting the transfer file to a network for transmission, in turn, to the remote device.

2. The method of claim 1, wherein the transfer file is in a format readable by the remote device.

3. The method of claim 1, wherein the one or more categories are selected from the group consisting of: (i) diagnostic trouble codes, (ii) screen shots, (iii) calibration data, (iv) troubleshooting data, (v) vehicle identification number, and (vi) parameter identifiers (PIDs).

4. The method of claim 1, wherein the categorized vehicle service data comprises one or more diagnostic trouble codes.

5. The method of claim 1, wherein the vehicle identifier is selected from the group consisting of: (i) a vehicle identification number associated with the first vehicle, (ii) a customer name associated with the first vehicle, (iii) a customer number associated with the first vehicle, and (iv) a repair order number associated with the first vehicle.

6. The method of claim 5, wherein the vehicle identifier is received from the remote device.

7. The method of claim 5, wherein the vehicle identifier is received via a user interface of the vehicle service tool.

8. The method of claim 1, further comprising:
associating an attachment file with the transfer file, wherein the attachment file comprises an oscilloscope pattern captured by the first vehicle service tool; and
transmitting the attachment file to the network for transmission, in turn, to the remote device,
wherein transmission of the transfer file to the network and transmission of the attachment file to the network occur at substantially the same time.

9. The method of claim 8, wherein the attachment file is selected from the group consisting of: (i) a graphical media file, and (ii) a video media file.

10. The method of claim 8, further comprising:
at the remote device, storing the transfer file and the attachment file, and
subsequently, deleting the transfer file and maintaining the attachment file in the data storage.

11. The method of claim 1,
wherein the remote device has access to data storage containing a database including a data record associated with the first vehicle,
wherein the data record comprises a plurality of fields including a field containing the vehicle identifier associated with the first vehicle,
the method further comprising:
receiving the transfer file at the remote device;
extracting the vehicle identifier from the transfer file received at the remote device so as to determine that the categorized vehicle service data is from the first vehicle;
extracting at least a portion of the categorized vehicle service data from the transfer file received at the remote device, and
storing the extracted vehicle service data into one or more fields of the data record associated with the first vehicle.

12. The method of claim 11, further comprising:
at the remote device, receiving from the first vehicle service tool a request for at least a portion of the data record associated with the first vehicle;
in response to receiving the request, transmitting to the first vehicle service tool the at least a portion of the data record associated with first vehicle, and
at the first vehicle service tool, displaying the at least a portion of the data record associated with the first vehicle,
wherein the at least a portion of the data record associated with the first vehicle comprises the extracted vehicle data stored into the one or more fields of the data record associated with the first vehicle.

13. The method of claim 12, further comprising:
at the remote device, receiving from the first vehicle service tool a request for the attachment file;
in response to receiving the request for the attachment file, transmitting the attachment file to the first vehicle service tool, and
playing the attachment file at the first vehicle service tool.

14. The method of claim 1, further comprising:
receiving, at the first vehicle service tool via the network, an attachment file comprising vehicle service data received by a second vehicle service tool from a second vehicle while the second vehicle service tool was connected to the second vehicle; and
displaying, at the first vehicle service tool, the attachment file for comparison of the vehicle service data of the attachment file to vehicle service data currently being received at the first vehicle service tool from the first vehicle.

15. The method of claim 14, wherein the attachment file comprises a video media file captured by the second vehicle service tool.

16. A method comprising:
connecting a vehicle service tool to a data link connector of a given vehicle having a service condition, wherein the given vehicle generates vehicle service data;
at the vehicle service tool, receiving vehicle service data transmitted from the given vehicle via a vehicle interface cable that connects the vehicle service tool to the data link connector of the given vehicle, wherein the received vehicle service data is associated with the given vehicle's service condition and is arranged according to a vehicle manufacturer's format;
at a computer-readable processor of the vehicle service tool, executing computer-readable program instructions to interpret the vehicle service data received from the given vehicle to determine which data of the received vehicle service data, arranged according to the vehicle manufacturer's format, is to be populated into a category of a transfer file that is (i) to be generated via the vehicle service tool and (ii) transmitted to a remote device;
generating, via the vehicle service tool, a transfer file including a vehicle identifier of the given vehicle and one or more categories of vehicle service data related to the given vehicle's service condition, wherein generating the transfer file comprises populating the category of the transfer file with the categorized vehicle service data from the received vehicle data that is to be populated into the category of the transfer file, and wherein a format of the transfer file differs from the vehicle manufacturer's format; and
the vehicle service tool transmitting the transfer file to a network for transmission, in turn, to the remote device.

17. The method of claim 16, wherein the service condition is selected from the group consisting of (i) a diagnostic trouble code being set in an electronic control unit of the given vehicle, and (ii) a programming mode to download software to the given vehicle.

18. The method of claim 16
wherein the populated category of the transfer file is pre-selected for the service condition; and
wherein a manufacturer of the vehicle service tool pre-selects the category of the transfer file.

19. A vehicle service tool comprising:
a processor that receives a vehicle identifier associated with a vehicle that generates vehicle service data arranged according a vehicle manufacturer's format;
a vehicle interface that is adapted to (i) connect to a data link connector of the vehicle that generates the vehicle service data, (ii) receive the vehicle service data from the vehicle while the vehicle interface is connected to the data link connector of the vehicle via a vehicle interface cable, and (iii) provide the processor with the vehicle service data received from the vehicle;
a network interface that interfaces to a network so as to allow the vehicle service tool to communicate with a remote device via the network, wherein the remote device is operable to read transfer files in a format that differs from the vehicle manufacturer's format of the vehicle service data received by the vehicle interface; and a non-transitory data storage device containing computer-readable program instructions executable by the processor, wherein the computer-readable program instructions include instructions that are executable by the processor to categorize the vehicle service data received from the vehicle, wherein categorizing the received vehicle service data comprises the processor interpreting the received vehicle service data to determine which data of the received vehicle service data, arranged according to the vehicle manufacturer's format, is to be populated into a category of a transfer file that is (i) to be generated via the processor and (ii) transmitted from the network interface to the remote device, wherein the computer-readable program instructions include instructions that are executable by the processor to generate a transfer file, including the vehicle identifier and one or more categories of vehicle service data, wherein generating the transfer file comprises populating the category of the transfer file with the categorized vehicle service data received from the vehicle that is to be populated into the category of the transfer file, and wherein a format of the transfer file differs from the vehicle manufacturer's format, and wherein the computer-readable program instruction include instructions that are executable by the processor to cause the network interface to transmit the transfer file to the network for transmission, in turn, to the remote device.

20. The vehicle service tool of claim 19, further comprising:

a user interface, wherein the vehicle service tool receives the vehicle identifier via the user interface, and wherein the vehicle identifier is selected from the group consisting of: (i) a vehicle identification number associated with the vehicle, (ii) a customer name associated with the vehicle, (iii) a customer number associated with the vehicle, and (iv) a repair order number associated with the vehicle.

21. The vehicle service tool of claim 19, wherein the vehicle service tool receives the vehicle identifier from the remote device, and wherein the vehicle identifier is selected from the group consisting of: (i) a vehicle identification number associated with the vehicle, (ii) a customer name associated with the vehicle, (iii) a customer number associated with the vehicle, and (iv) a repair order number associated with the vehicle.

\* \* \* \* \*